May 23, 1933.  W. S. FINNELL  1,910,325
FLOOR MOPPING MACHINE
Filed Jan. 21, 1929  4 Sheets-Sheet 4

Witness
Martin A. Olsen

Inventor
Walter S. Finnell
By Rector, Hibben, Davis & Macauley Attys.

Patented May 23, 1933

1,910,325

UNITED STATES PATENT OFFICE

WALTER S. FINNELL, OF ELKHART, INDIANA

FLOOR MOPPING MACHINE

Application filed January 21, 1929. Serial No. 333,821.

My invention relates generally to floor mopping machines and it has to do particularly with a vacuum-operated machine of this character arranged for rinsing and which is mounted on a wheeled support for propulsion over the floor to collect and remove soil therefrom.

One of the objects of my invention is to provide an improved, compact and simple vacuum-mopping machine which may be easily propelled along the floor to mop the latter without streaking, smearing, etc., and which may be efficiently used for mopping relatively small floor spaces, such as in the home, as well as the floors of offices, public buildings, manufacturing plants, etc.

Another object is to provide an improved mopping machine which embodies but few parts which are not likely to get out of order, such machine including a squeegee for collecting the soil along the floor; a vacuum chamber associated with the squeegee in such a way that the collected soil is fed to said chamber by a continuously acting and uniform suction; and a separate and independently removable soil receptacle into which the soil is automatically fed or dumped at intervals from the vacuum chamber, the arrangement being such that the vacuum chamber is emptied of soil when the machine is stopped.

A further object is to provide a novel form of nozzle associated with the squeegee for feed of the soil from the squeegee into the vacuum chamber. This arrangement is such that a free flow of air through the nozzle is at all times provided for so as to create, constantly during the mopping operation, the desirable air-drag and friction condition to establish and maintain a positive force feed of the soil from the squeegee into the vacuum chamber.

Still another object is to provide means whereby the soil and air delivered into the vacuum chamber are separated. To this end, I provide a novel separator structure located within the vacuum chamber for segregating the air and soil so that, normally, air only is exhausted by the air exhausting means, the soil falling to the bottom of the chamber from whence it is eventually delivered into the removable soil receptacle.

Other objects are to provide in conjunction with the mopping apparatus a rinsing means which includes a clean water receptacle mounted upon the main frame of the machine and in which the vacuum chamber is located and from which clean water under manual control is delivered to the floor ahead of the squeegee in an improved manner to thoroughly flush and rinse the floor surface; to provide means for catching any soil that may be withdrawn from the vacuum chamber by the exhausting means and for delivering such soil to the removable soil receptacle instead of upon the floor; to provide an improved form of mounting for the soil receptacle which permits the same to be readily and quickly removed from the machine and replaced thereon without the breaking or making of any connections and without disturbing the vacuum chamber and its connections; and to provide novel guide means for facilitating the dumping of the soil from the soil receptacle.

Additional objects and advantages will become apparent as this description progresses and by reference to the drawings wherein,—

Figure 1:
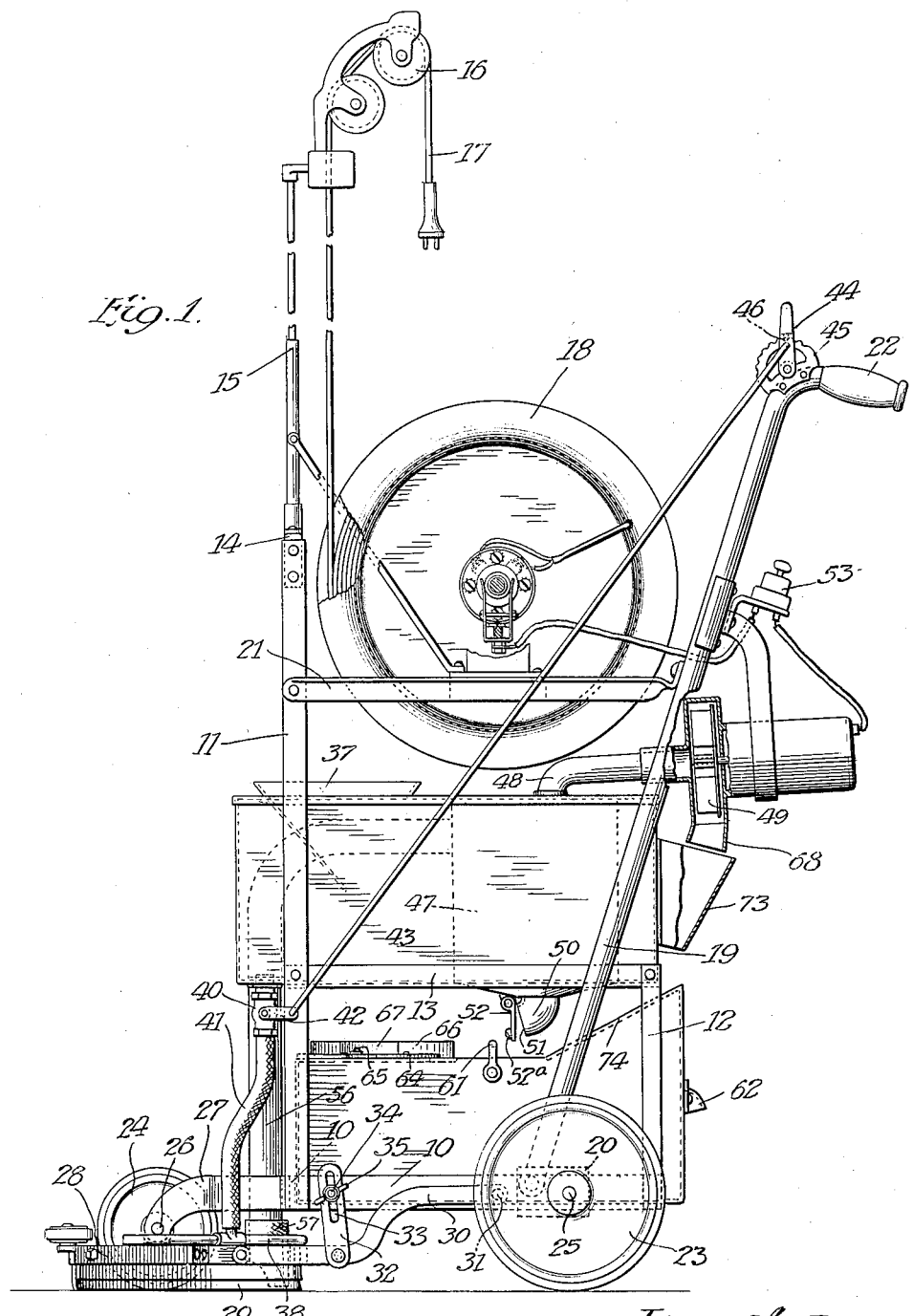
Figure 1 is a side elevational view of one form of floor mopping machine embodying my invention.
Figure 2:
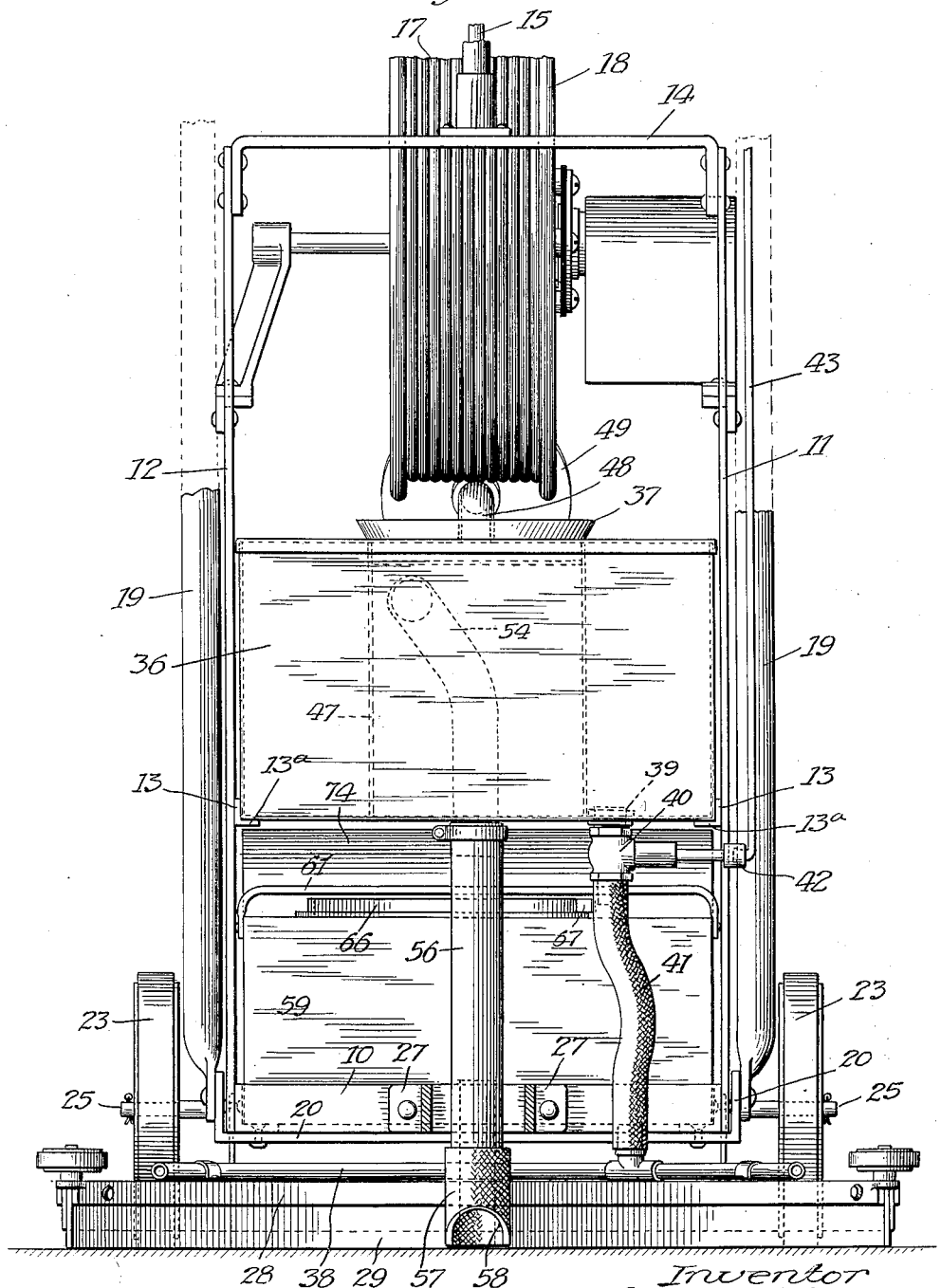
Fig. 2 is an enlarged front elevational view partially in section of the machine of Fig. 1, certain of the parts being broken away.

Referring particularly to the structure shown in the drawings, I employ a frame (Figs. 1, 3 and 4) consisting of a U-shaped bottom piece 10 formed of angle iron and arranged with its horizontal angle leg 10ª extending inwardly. Front and rear uprights 11, 12 are rigidly connected to the opposite sides of the bottom piece 10 and these uprights are further connected and braced by side angle bars 13. The front uprights 11 are joined together by a cross strip 14 (Figs. 1 and 2) which supports a telescoping standard 15 and the latter in turn supports a pair of pulleys 16 which carry the electric cord 17 of the self-winding reel 18. A pair of handle pieces 19 having handgrips are connected to the opposite upstanding ends or legs of a U-bar 20 fixedly connected to the bottom piece 10. Bars 21 join the front uprights and the respective handle pieces 19 to rigidly brace the handle and additionally brace the frame structure, and these bars serve to support the reel 18. The frame is arranged to be propelled along the floor surface by means of a pair of rear wheels 23 and front wheel 24. The rear wheels are each mounted on a short shaft 25 which is fixedly carried by the upstanding legs of the U-shaped cross-piece 20. The front wheel is mounted upon a shaft 26 supported by and between a pair of arms 27 which are attached to the front part of the U-frame member 10.

The frame supports a squeegee, a clean water and rinsing unit, a vacuum chamber and vacuum-producing means, and an independently removable soil receptacle or can into which the soil removed from the floor is dumped from the vacuum chamber.

More specifically, the squeegee unit comprises a V-shaped supporting frame 28 (Figs. 2 and 4) of comparatively wide sweep which supports a rubber squeegee strip 29 of similar shape and sweep. The squeegee frame 28 is provided with arms 30 which are pivotally connected to the bottom piece 10 as at 31. Each of these arms is provided intermediate its end with a pivoted link 32 having a slot 33 (Fig. 1) in which is received a threaded stud 34 carried by the bottom U-frame piece 10. The stud 34 is adapted to receive a thumb nut 35 for adjustably clamping the link 32 in place.

My mopping machine is well suited to follow along after a scrubbing machine to mop the floor after the scrubbing operation; or it may as well be used to mop the floor following a hand-scrubbing operation or otherwise. Further, in the use of my invention, the apparatus may be directly associated with a scrubbing machine, or it may become a part of a scrubbing machine so as to provide a combined scrubbing and mopping arrangement. In either event, the soil loosened by scrubbing may best be removed by diluting the same, and by rinsing the floor, preceding the mopping operation, and this is particularly true if scouring materials are used in the scrubbing operation. My invention provides for this desirable feature as follows: A clean water tank 36, access to which is had through the spout structure 37, is stationarily carried by the inwardly extending horizontal legs 13$^a$ of the frame brace bars 13 above described. The squeegee frame 28 carries a substantially V-shaped clean water flow pipe 38 which has its opposite ends open and turned slightly inward to discharge forwardly of the squeegee. This pipe is of such size as to discharge a volume of water at the ends of the squeegee sufficient to rinse the floor and dilute the soil thereon. An effective rinsing and soil-diluting action takes place as the water spreads out upon the floor forwardly of the squeegee and as such water is swept along and directed rearwardly toward the center or apex of the squeegee. The flow of water to the rinsing pipe 38 is effected by means of a nipple 39 connected to a suitable opening in the forward bottom wall of the clean water tank 36, a valve 40 and a flexible conduit 41. The valve 40 is controlled by means of a link 42, rod 43, and handle unit 44 (Fig. 1) which is supported by one of the propelling handles 19. The handle 44 is located conveniently for manual control by the operator and this handle may be set in any desired position of adjustment, dependent upon which one of the grooves or notches of the piece 45 are engaged by its yieldable-spring-pressed plunger 46, as will be well understood.

The collected soil is removed from the floor by a suction action established through the medium of a vacuum chamber into which the removed soil is initially delivered. To this end, I provide a cylindrical receptacle 47 (Fig. 3) within the clean water tank 36. The air is exhausted from this receptacle through a conduit 48 by an electrically driven exhausting fan 49. The bottom of this receptacle tapers downwardly somewhat and terminates in a discharge nozzle 50 having a side outlet 51 which is disposed in a plane tilted slightly forward from the vertical. The outlet of this nozzle is adapted to be closed under certain conditions by a flap valve 52, as will be explained more fully hereinafter. The exhaust fan motor is controlled by a switch 53 and, when the switch is turned "on" and the fan 49 operated, air is exhausted from the receptacle 47 and a partial vacuum is established in the latter tending to close the flap valve 52 and hold the same closed. The weight 52$^a$ on the lower edge of this flap valve gives it a balance desirable for ready closing and opening movements.

The partial-vacuum established in the receptacle 47 is utilized to remove the soil from the floor. I employ a conduit 54 disposed within the clean water tank 41 and connected at its one end to the upper part of the vacuum receptacle 47 and at its other end to a nipple 55 in the bottom of the receptacle 36. A conduit extension 56 leads from the nipple 55 downwardly and adjacent the walls of the center of the squeegee. The lower end of the extension 56 is provided with a nozzle 57 formed, preferably, of a flexible material such as rubber, and into which the soil first passes in its travel to the vacuum receptacle 47. The forward bottom edge of the nozzle 57 is cut away in semi-circular fashion as at 58 (Figs. 2 and 3) to insure at all times during operation a flow of air into the nozzle and through the conduits 56 and 54. This arrangement provides the proper flow of air to set up the necessary air-drag and air-friction condition at the nozzle inlet to start flow of the soil into the nozzle and through the conduits and to maintain such flow, which might not take place if the wall of the nozzle extended downwardly in cylinder-fashion so that the bottom of the nozzle would seal against the soil on the floor and cut off the free flow of air. The partial vacuum condition set up and maintained in the vacuum receptacle 47 insures a constant, uniform suction at the nozzle inlet and a constant, uniform inflow of air through the nozzle inlet and conduits 56 and 54, with a consequent uniform picking up and carrying along of the soil which is collected by the squeegee.

The vacuum receptacle 47, as will be appreciated, must be emptied from time to time. It is highly desirable that this be accomplished without in any way disturbing the receptacle and its connections. To take care of this condition, I provide for automatically dumping the collected soil, at intervals, from the vacuum receptacle 47 into a dirty water or soil receptacle 59. The vacuum condition established in the receptacle 47, as will be well understood, will close the flap valve 52 and will hold the same closed until a predetermined amount of soil has been collected in the receptacle 47. When the soil collected in the receptacle 47 is sufficient to offset the differential of pressure acting on the valve 52 to hold the same closed, such valve will be opened as will be well understood, and the soil will be dumped directly downward into the soil receptacle 59.

The soil receptacle 59 has a generally rectangular shape and fits within the U-shaped frame base member 10 upon the inwardly extending horizontal flange or leg 10ª of the latter. The mid-portion of the upper wall of this receptacle is provided with an opening 60 which is disposed directly beneath the vacuum receptacle dump valve 52. The rear of the U-shaped frame piece 10 is open so that the receptacle may be freely slid outwardly and inwardly from the rear to remove and replace the same upon the frame. A bail 61 at the mid-upper portion of the receptacle and a hand-hold 62 at its rear end facilitate removal and emptying of the receptacle. It is obvious that this receptacle may be removed at will to empty the dirty water therefrom without disturbing the vacuum receptacle 47 or any of its connections.

Figure 3:
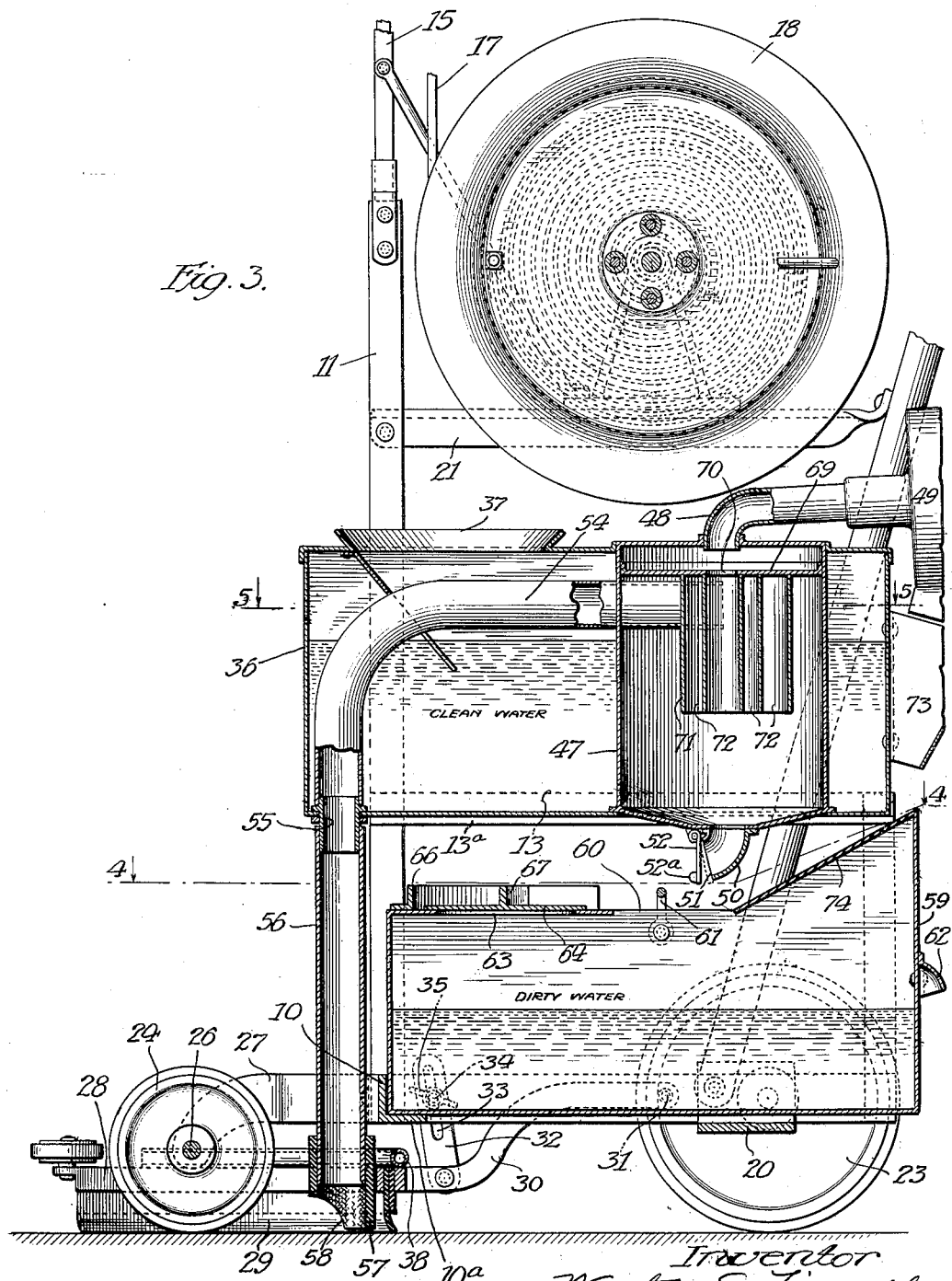
Fig. 3 is an endwise vertical sectional view, certain of the parts being broken away.
Figure 4:
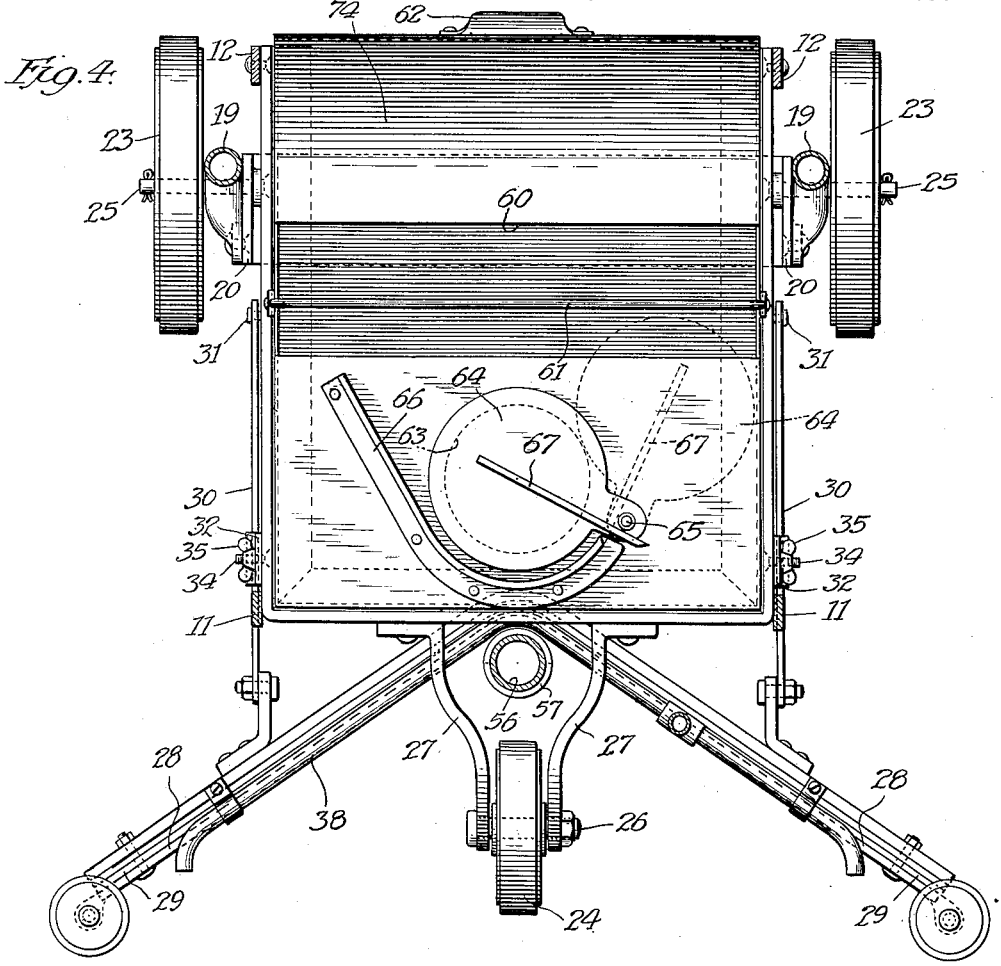
Fig. 4 is a horizontal section taken substantially on line 4—4 of Fig. 3.

To facilitate pouring of the soil from the soil receptacle 59, I provide in its top wall a pour-opening 63 which is normally closed by a cover plate 64 which is pivotally connected to the top wall of the receptacle as at 65 (Figs. 3 and 4). It is obvious that to empty the receptacle, the cover is rotated back out of the way into the position indicated in dotted lines in Fig. 4. Since the top of the dirty water receptacle 59 is open at its mid-portion, it is likely that at times in emptying the receptacle it may be tipped to such extent that some of the water may be spilled out through its top opening 60. In that case, to avoid spilling of the water or soil sidewise, I provide a so-called spout arrangement which takes the form of a piece of angle iron 66 having one end formed to a semi-circular shape approximately the contour of the cover plate 64 with its opposite end extended diagonally across the top of the receptacle toward the opening 60 as best illustrated in Fig. 4. The cover plate 64 is provided with a cross rib 67 which may serve as a hand hold for opening and closing the cover and which in the open position of the cover serves as an extension of the semi-circular end of the member 66 and such extension projects similarly to the opposite end of such member. As illustrated in Fig. 4, this arrangement with the cover plate in its open position provides, in effect, a continuous V-shaped spout surrounding the pour-opening 60, and the ends of the V-spout extend outwardly to such an extent that any soil that may splash or be poured through the receptacle top opening 60 will be directed to the common pouring point. Further the member 66 serves as a stop for positioning the cover plate 64 over its pour-opening 63.

Since the soil passes through the vacuum chamber in its travel to the soil receptacle 47, it is very desirable that means be provided to prevent, as far as possible, the exhausting of the soil along with the air exhausted by the fan 49. To that end, I provide a device within the vacuum chamber whereby the soil is separated from the air and is caused to fall downwardly toward the bottom of the receptacle while the air is caused to pass out through the fan exhaust 68.

Figure 5:
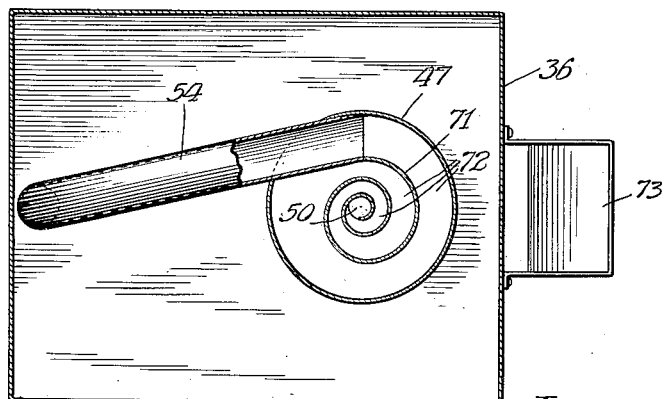
Fig. 5 is a reduced horizontal section taken substantially on line 5—5 of Fig. 3.

The separator which I provide takes the form of a horizontal, circular plate 69 (Fig. 3) mounted in and forming a partition in the top part of the vacuum chamber 47. The portion of the chamber 47 on the opposite sides of the partition piece 69 are in communication through a central opening 70 in such piece. This partition piece supports an involutely wound strip 71 (Figs. 3 and 5) which provides a comparatively deep, continuous winding passage 72 leading from the outer part of the vacuum receptacle wall to the center of the receptacle where it communicates with the opening 70 in the plate 69. This strip is, preferably (but not necessarily), so mounted in the receptacle 47 that the outer section of the involute passage 72 is formed, in part, by the wall of such receptacle (Fig. 5). The discharge end of the soil conduit 54 is in direct communication with the inlet to this passage 72, so that the soil and air in order to pass through the partition opening 70 and through the exhaust conduit 48 to the exhaust 68 would have to first pass through the entire involute passage 72. Practical demonstration has shown that with this arrangement, the heavier soil, dirty water, etc., tends to fall downwardly toward the bottom of the receptacle, and the soil will so fall before it passes through the entire passage 72 to the point of direct communication with the partition opening 70. The suction set up by the fan 49 draws the air around through the passage 72, through the partition opening 70 and exhausts the same through the discharge nozzle 68, and by the time the air reaches the partition opening 70, practically all of the soil is separated therefrom. This separation is aided by the rubbing action afforded by the walls of the passage 72 and the tortuous path which the material must follow to reach the opening 70.

Under certain conditions the exhausted air may carry moisture and, in some cases some soil, which, if deposited upon the already-mopped floor, would require re-mopping. To avoid this, the exhaust fan discharge 68 is directed downwardly toward a funnel 73 carried by the rear of the clean water receptacle 36. The soil receptacle projects slightly to the rear of the clean water receptacle and back far enough so that the funnel 73 discharges down upon the same. The rear of the soil receptacle is slightly deeper than its front to provide a tapered rear top wall surface 74 which receives any moisture, or drippings, or soil which is exhausted through the discharge 68 and funnel 73 and directs the same toward the soil receptacle top opening.

In operation, when it is desired to mop the floor, the operator sets the water-control handle 44 to discharge the desired amount of water ahead of the squeegee. The switch 53 may then be turned "on" causing the exhaust fan to operate to produce a partial vacuum within the receptacle 47 and to close the flap valve 52. The operator then moves the machine along the floor by means of the handles 22 and the squeegee collects and directs the diluted soil toward its center or apex and toward the nozzle 57. As the soil collects at the nozzle 57, it is picked up by the air sucked through the nozzle and is carried to the vacuum receptacle 47. When a predetermined amount of soil collects in this receptacle, the valve 52 is opened and such soil dumps directly into the dirty water receptacle 59, after which the valve again closes and additional soil is collected as the mopping operation is continued. When the mopping is complete or when the soil receptacle becomes filled, it is pulled rearwardly from the frame by means of its hand hold 62 and emptied in the manner already described. One advantage of the foregoing vacuum chamber dumping arrangement is that as soon as the machine is stopped and the exhaust fan 49 ceases to operate, the valve 52 automatically opens and the material in such chamber is dumped. Thus, the vacuum chamber is always kept comparatively free of sediment and clean so that it is always in condition for efficient operation.

Additional advantages of my invention are that it is very simple and inexpensive to manufacture. Very few parts, including moving parts, are employed, thereby lengthening the life of the machine and cutting down upkeep and repair costs. It is very efficient in operation and, with it, floors may be thoroughly mopped rapidly and without duplication of labor. Once the floor has been mopped, nothing more need be done until the next mopping period. There are no parts which are likely to clog and get out of order.

It will be understood that by the use of the term "soil" herein, I mean dirt, dirty water and any other substance that may be upon the floor and which may be removed during the mopping operation. It is to be further understood that while I have shown and described but one form of my invention, various other changes and details and arrangement of parts may be made without departing from the spirit and scope of my invention as defined by the claims which follow.

I claim:

1. In a floor mopping machine, a frame, a squeegee supported forwardly of and by said frame, a clean water receptacle mounted on said frame above said squeegee, a discharge pipe carried by said squeegee and open only at its opposite ends and its ends being turned forwardly to discharge forwardly and within the sweep range of said squeegee, a conduit between said clean water receptacle and said discharge pipe, and a means manually operable for controlling the flow of water from said receptacle to said pipe.

2. In a floor mopping machine, a frame, a V-shaped squeegee supported forwardly of and by said frame and having a comparatively wide sweep range, a clean water receptacle mounted on said frame to the rear of and higher than said squeegee, a discharge pipe shaped similarly to said squeegee and carried by the latter and said pipe being open only at its opposite ends near the ends of said squeegee and its ends being turned forwardly to discharge forwardly and within the sweep range of said squeegee, a conduit between said clean water receptacle and said discharge pipe, a valve in said conduit, and valve actuating means extending to a point convenient to the hand of the operator for controlling the flow of water through said pipe to the floor.

3. In a mopping machine, a squeegee, a clean water receptacle, means for discharging water from said receptacle forwardly of said squeegee, a receptacle providing a vacuum chamber within said clean water receptacle, means for producing a partial vacuum in said vacuum chamber, a suction nozzle within the soil collecting area of said squeegee, a suction-soil-flow conduit between said nozzle and said vacuum chamber, and a wheeled support for the foregoing structure.

4. In a mopping machine, a squeegee, a clean water receptacle, means for discharging water from said receptacle forwardly of said squeegee, a receptacle providing a vacuum chamber within said clean water receptacle, means for producing a partial vacuum chamber, a suction nozzle within the soil collecting area of said squeegee, a suction-soil-flow conduit between said nozzle and said vacuum chamber, a soil-receiving receptacle, and means for dumping the soil from said vacuum chamber into said soil-receiving receptacle.

5. In a mopping machine, a frame, a squeegee carried by said frame, a clean water receptacle carried by said frame above said squeegee, means for discharging water from said receptacle forwardly of said squeegee, a receptacle providing a vacuum chamber within said clean water receptacle, means for producing a partial vacuum in said vacuum chamber, a suction nozzle within the soil collecting area of said squeegee, a suction-soil-flow conduit between said nozzle and said vacuum chamber, and another receptacle mounted beneath said clean water receptacle and vacuum chamber form receiving soil from the latter, said other receptacle being mounted on said frame for removal without breaking any connections.

6. In a mopping machine, a squeegee, a combined vacuum and soil-receiving receptacle in communication with the soil collecting area of the squeegee, means for producing and maintaining a partial vacuum in said receptacle, an independently removable soil-receiving receptacle for receiving the soil from said first receptacle, and means controlled by the vacuum condition within said first receptacle and the soil therein for delivering the soil from said first receptacle into said independently removable receptacle.

7. In a mopping machine, a squeegee, a combined vacuum and soil-receiving receptacle, means for producing and maintaining a partial vacuum in said receptacle, a conduit leading from said receptacle and having a suction nozzle located in the soil collecting area of said squeegee and through which air and soil are sucked into said receptacle, another receptacle for receiving the soil from said vacuum receptacle, and means for controlling the discharge of the soil from the vacuum receptacle to said latter-mentioned receptacle.

8. In a mopping machine, a frame, a squeegee carried by said frame, a receptacle carried by said frame and connected to the soil collecting area of said squeegee for receiving soil therefrom, means for producing and maintaining a partial vacuum in said receptacle to suck soil thereinto from said squeegee, and means for automatically dumping the soil from said receptacle at predetermined intervals.

9. In a mopping machine, a frame, a squeegee carried by said frame, a receptacle having an outlet in its bottom carried by said frame and connected to the soil collecting area of said squeegee for receiving soil therefrom, means for producing and maintaining a partial vacuum in said receptacle to suck soil thereinto from said squeegee, and a valve for closing said outlet carried by said receptacle and normally held closed by the differential pressure condition set up on its opposite sides by the vacuum within the receptacle, and adapted to open to dump the soil from said receptacle when sufficient soil is received therein to reverse the normal differential pressure condition.

10. In a mopping machine, a frame, a squeegee carried by said frame, a receptacle having a discharge nozzle in its bottom, said nozzle having an outlet disposed in a substantially vertical plane, said receptacle being carried by said frame and connected to the soil collecting area of said squeegee for receiving soil therefrom, means for producing and maintaining a partial vacuum in said receptacle to suck soil thereinto from said squeegee, and a flap valve pivotally suspended over said nozzle outlet so as to normally assume an outlet-open position, and which is held closed by the vacuum condition within the receptacle until the soil collected therein is sufficient to overcome atmospheric pressure acting on its exterior surface.

11. In structure of the class described, a soil-receiving receptacle in which soil is received directly from the floor surface, a suction producing means, conduit means leading from the floor surface to said suction-producing means and having a part thereof passing through said receptacle, said part having its bottom portion open throughout its length in order that the soil passing therethrough will tend to fall toward the bottom of said receptacle, and means for automatically discharging the soil from said receptacle which includes a valve in the bottom of said receptacle held normally closed by the suction action of said suction-producing means but being adapted to open and discharge when a predetermined amount of soil is collected to overcome the suction acting thereon.

12. In a mopping machine, a frame, and a soil receptacle mounted on said frame, said receptacle comprising top, bottom and side walls, said top wall having a central opening therein and another opening at its forward end, a cover for the latter opening swingably mounted on the top wall, and means associated with said top wall and cover for providing in the open position of said cover a pouring spout for confining material which may pass through both said openings to the pour point when the receptacle is tipped forwardly to empty the same.

13. In a mopping machine, a frame, and a soil receptacle mounted on said frame, said receptacle comprising top, bottom and side walls, said top wall having a central opening therein and another opening at its forward end, a cover for the latter opening swingably mounted on the top wall, an upstanding rib on said top wall having a portion located adjacent said opening for stopping said cover in its closed position and said rib extending toward the sides of said receptacle and said central opening, and an upstanding rib on said cover serving as a handle and in the open position of said cover forming with said other rib a pouring spout to catch and direct soil which may be spilled through said central opening when the receptacle is tipped to empty same.

14. In a mopping machine, a soil receptacle having top, bottom and side walls, a central opening in the top wall, a pour opening in the forward part of the top wall, the part of said top to the rear of said central opening being inclined upwardly whereby moisture or drippings applied thereto are directed toward the central opening provided by the receptacle, and hand-hold devices carried by the receptacle walls for carrying and for tipping the receptacle to pour its contents through said pour opening.

15. In a mopping machine, a frame, a combined vacuum and soil-receiving receptacle rigidly carried by said frame, a discharge means in the bottom of said receptacle, a soil receptacle having top, bottom and side walls and mounted on said frame beneath said combined receptacle, said soil receptacle being slidably mounted on said frame for free removal without breaking any connections, a central opening in the top wall of said soil receptacle beneath said discharge means, a pour opening in the forward part of the top wall, the part of said top to the rear of said central opening being inclined upwardly, and hand-hold devices carried by the receptacle walls for carrying and for tipping the receptacle to pour its contents through said pour opening.

16. In a mopping machine, a combined vacuum and soil-receiving receptacle, means, including an exhaust fan and fan exhaust nozzle, for exhausting air from said receptacle, a soil receptacle beneath said combined receptacle having a top wall with an opening therein, the top wall to the rear of said opening being inclined upwardly, and a deflector device in communication with said fan exhaust nozzle and said inclined top wall surface whereby moisture and soil exhausted by said fan will be delivered to said soil receptacle.

17. In a mopping machine, a combined vacuum and soil-receiving receptacle, means, including an exhaust fan and downwardly extending fan exhaust nozzle, for exhausting air from said receptacle, a soil receptacle beneath said combined receptacle having a top wall with an opening therein beneath said combined receptacle, the top wall to the rear of said opening being inclined upwardly, means for discharging soil from said combined receptacle through said top wall opening, and a funnel-shaped device mounted beneath said fan and exhaust nozzle and communicating with said inclined top wall surface whereby moisture and soil exhausted by said fan will be delivered to said soil receptacle.

18. In a mopping machine, a squeegee, a combined vacuum and soil-receiving receptacle, means for producing a partial vacuum in said receptacle, a conduit connected to said receptacle and leading to said squeegee, and a tubular soil inlet member on the squeegee end of said conduit located within the soil collecting area of said squeegee, said member having its inlet located close to the floor and having its forward inlet edge cut away to at all times provide for a free flow of air into and through said member by the suction established by connection of said conduit with said receptacle.

19. In a mopping machine, a soil-receiving receptacle in which soil and air are received directly from the floor surface, means for producing a partial vacuum in said receptacle, a conduit connected to said receptacle and leading to adjacent the floor surface, a separate, flexible tubular inlet member mounted on the floor-end of said conduit, and having a mouth opening downward toward the floor surface, said member including means for maintaining the free flow of air and soil through said member and conduit by the suction established by the connection of said conduit with said receptacle upon contact of the open mouth of said member with the floor surface or the soil thereon.

20. In a floor mopping machine, a frame, a squeegee supported forwardly of and by said frame, a clean water receptacle mounted on said frame, a discharge pipe supported by said squeegee adapted to discharge water forwardly and within the sweep range of the squeegee, a conduit between the clean water receptacle and the discharge pipe and means for controlling the flow of water from the receptacle to said pipe.

21. In a floor mopping machine, a frame, a squeegee supported forwardly of and by said frame, a clean water receptacle mounted on said frame, a discharge pipe attached to said squeegee adapted to discharge water forwardly and within the sweep range of the squeegee, a conduit between the clean water receptacle and the discharge pipe and means for controlling the flow of water from the receptacle to said pipe, suction producing means provided by the machine and having a nozzle associated therewith and extending to the collecting area of the squeegee and adapted to suck water and soil from said area, and a receptacle for receiving the water and soil thus removed from the collecting area of the squeegee by the suction producing means.

22. In a mopping machine, a squeegee, a receptacle having a discharge opening and connected to the soil collecting area of said squeegee, means for producing and maintaining a partial vacuum in said receptacle to suck soil thereinto from said soil collecting area, and a valve acting under the control of the partial vacuum in said receptacle to normally close said discharge opening and adapted to be opened by the soil collected in said receptacle when sufficient amount of soil has been collected therein to overcome the differential pressure effect of the partial vacuum therein.

In testimony whereof, I have subscribed my name.

WALTER S. FINNELL.